US010519056B2

United States Patent
Magbag et al.

(10) Patent No.: US 10,519,056 B2
(45) Date of Patent: Dec. 31, 2019

(54) DEVICE FOR HANDLING THE EDGE OF A RIBBON OF FLOAT GLASS, COMPRISING AN INCLINED-AXIS WHEEL, AND INSTALLATION COMPRISING SUCH DEVICE

(71) Applicant: FIVES STEIN, Maisons Alfort (FR)

(72) Inventors: Apolonio Magbag, Ixelles (BE); Mustapha Nedjar, Omal (BE); Hasan Avdijaj, Molenbeek Saint-Jean (BE)

( * ) Notice: Subject to any disclaimer, the term of this patent is extended or adjusted under 35 U.S.C. 154(b) by 226 days.

(21) Appl. No.: 15/528,054

(22) PCT Filed: Nov. 19, 2015

(86) PCT No.: PCT/EP2015/077154
§ 371 (c)(1),
(2) Date: Sep. 5, 2017

(87) PCT Pub. No.: WO2016/079260
PCT Pub. Date: May 26, 2016

(65) Prior Publication Data
US 2018/0170788 A1 Jun. 21, 2018

(30) Foreign Application Priority Data

Nov. 19, 2014 (BE) .................................. 2014/5070

(51) Int. Cl.
*C03B 18/06* (2006.01)
*C03B 18/10* (2006.01)
(Continued)

(52) U.S. Cl.
CPC .............. *C03B 18/06* (2013.01); *C03B 18/10* (2013.01); *C03B 18/18* (2013.01); *C03B 18/22* (2013.01); *C03B 35/184* (2013.01)

(58) Field of Classification Search
CPC ......... C03B 18/06; C03B 18/10; C03B 18/18; C03B 18/22; C03B 35/184
See application file for complete search history.

(56) References Cited

U.S. PATENT DOCUMENTS 3,533,772 A * 10/1970 Itakura .................... C03B 18/06
65/182.4
3,713,797 A 1/1973 Lawrenson
(Continued)

FOREIGN PATENT DOCUMENTS

EP 1340721 A2 * 9/2003 ............. C03B 18/06
EP 2534107 12/2012
(Continued)

OTHER PUBLICATIONS

Corresponding Search Report for BE201405070 dated Jul. 13, 2015. BE.
(Continued)

Primary Examiner — Queenie S Dehghan
(74) Attorney, Agent, or Firm — The Belles Group, P.C.

(57) ABSTRACT

Device for manipulating the edge of a ribbon of glass comprising a wheel, and float glass installation comprising such a device. A device for manipulating the edge of a ribbon of pasty glass travelling on a bath of liquid in a float chamber, comprising a wheel (1) positioned at a distal end of a barrel (2), the wheel (1) being turned about its own axis, this axis being concurrent with the longitudinal geometric axis of the barrel and making therewith a permanent fix angle determined by design, the barrel (2) having a possibility for adjustment in rotation about its longitudinal axis, and installation comprising such a device.

17 Claims, 3 Drawing Sheets

(51) Int. Cl.
*C03B 18/18* (2006.01)
*C03B 18/22* (2006.01)
*C03B 35/18* (2006.01)

(56) References Cited

U.S. PATENT DOCUMENTS

| | | | |
|---|---|---|---|
| 3,850,787 A | | 11/1974 | Robinson et al. |
| 4,316,733 A | * | 2/1982 | Lawhon .................. C03B 18/06 65/182.4 |
| 4,343,642 A | | 8/1982 | Edge |

FOREIGN PATENT DOCUMENTS

| | | |
|---|---|---|
| WO | 2011098423 | 8/2011 |
| WO | 2013157477 | 10/2013 |

OTHER PUBLICATIONS

Corresponding International Search Report for PCT/EP2015/077154 dated Feb. 22, 2016. WO.

* cited by examiner

DEVICE FOR HANDLING THE EDGE OF A RIBBON OF FLOAT GLASS, COMPRISING AN INCLINED-AXIS WHEEL, AND INSTALLATION COMPRISING SUCH DEVICE

PRIORITY

Priority is claimed as a national stage application, under 35 U.S.C. § 371, to international patent application No. PCT/EP2015/077154, filed Nov. 19, 2015, which claims priority to Belgian patent application 20145070, filed Nov. 19, 2014. The disclosures of the aforementioned priority applications are incorporated herein by reference in their entirety.

FIELD OF APPLICATION

The present invention relates to a device for handling the edge of a ribbon of glass in viscous form being displaced on a liquid metal bath in a float chamber, according to the flat glass production process known as float glass.

In general, this device for handling the edge comprises a wheel, i.e. a part in the form of a disc or wheel, the periphery of which is provided with radial protuberances in the form of teeth, also distributed on this periphery, in one or a plurality of rows. For each row, the radial geometric axes of the teeth are contained in a virtual disk which is perpendicular to the axis of the wheel. This wheel is secured on the end of a lance with which it is mechanically integral, the lance being cylindrical of revolution and having the form of a long rod. The lance is supported by being inserted inside a hollow part known as a barrel, which is also cylindrical of revolution. The barrel is secured in rotation according to its cylindrical axis, whereas the lance, and consequently the wheel which is secured on its end, are rotated according to the axis of the lance by means of a mechanism which makes it possible to control a variable speed.

PRIOR ART, IMPERFECTIONS OF THE PRIOR ART, AND TECHNICAL PROBLEM TO BE SOLVED

This device, which will be called an "edge device" here, but which depending on the regions and languages can be known in particular as an "attenuator", "top-roll" or "top roller" or "edge machine", is generally installed on the border of a float chamber comprising a bath of molten metal, such as tin for example. Molten glass in viscous form is poured continuously at a temperature of approximately 1000° C. onto this molten metal bath, such as to allow the glass to float, spread, and obtain the required thickness when it is in the viscous state, in order finally to cool the sheet or ribbon of glass thus formed at the output from the float chamber, in order to solidify it before subjecting it to the heat treatments of the annealing lehr.

The process is continuous, in the sense that, at the output from the furnace, where the glass is poured into the float chamber, at the cutting line of the glass, there is only a single ribbon of glass at different temperatures and in different states.

The physical and chemical properties (temperature, viscosity, density, surface tension, etc.) of the glass, the tin, and the controlled atmosphere of the bath, are such that, in the usual production conditions, the glass which is subjected to gravity floats and spreads to a thickness of approximately 5.5 mm, which is known as the natural balance thickness.

The edge devices serve the purpose of modifying the balance forces of the ribbon of floating glass, in order to modify the thickness of glass and adjust it as required, as disclosed in particular in FR-A-2581984. For this purpose, the wheel acts by contact and penetration of the peripheral toothing in the thickness of the ribbon of glass, in the vicinity of the natural edge of the glass, thus creating a guide for the edge of the ribbon according to a specific direction, either to move the edge of the ribbon away from its center when it is wished to increase the width of the ribbon, or to bring the edge of the ribbon towards its center when it is wished to decrease the width of the ribbon, whilst accompanying the displacement of the ribbon of glass by rotation of the wheel according to its axis with a circumferential speed which is close to the natural speed of displacement of the ribbon of glass in this location. "Plane of rotation of the wheel" describes the plane of the disc which contains the radial axes of the teeth, or depending on the application, in the case of a plurality of rows of teeth, the mid-plane of the discs containing the radial axes of the teeth.

The edge devices are placed in pairs on both sides of the float chamber, and their toothed wheels drive and guide the edges of the floating ribbon.

The rotation of the wheel makes it possible to accompany the edge of the ribbon of glass in its flow on the surface of the tin, in the natural global direction of the process. The effect of increasing, decreasing or maintaining the width of the ribbon is obtained by the angle which the wheel imposes on the flow of the edge of the ribbon. By convention, this angle is generally described as positive for widening of the ribbon and negative for narrowing of the ribbon. The effective direction according to which the teeth of the wheel are displaced in contact with, and in penetration in, the edge of the ribbon is known as the "effective direction" of the edge device. In practice, for the purpose of geometric simplification, this direction is determined as the intersection of the plane of the upper surface of the ribbon of glass and the plane of rotation of the wheel. The name "effective angle" of the edge device will commonly be given to the angle formed by the "effective direction" and the axis of the bath generally known as the axis X, which is the axis according to which the ribbon of glass is globally displaced, and is identical to the main axis of the bath.

For good understanding of the effect of the wheels on the edge of the ribbon of glass, it is also necessary to take into account the angle formed by the plane of rotation of the wheel, and a vertical plane containing the "effective direction". This angle will be known as the "angle of gripping", and by convention will be positive for inclination of the plane of rotation of the wheel towards the center of the ribbon. Thus, in the case of a positive angle of gripping, the teeth which penetrate in the edge of the ribbon are inclined relative to the vertical, and their tops are oriented towards the exterior of the ribbon.

The balance forces of the ribbon tend to bring the ribbon of glass slowly to its natural balance state when the edges are no longer directly constrained by a wheel. It is therefore necessary to maintain or increase the effect obtained by the first pair of edge devices, by installing successive edge devices according to the axis of the process.

In general, the more the thickness produced becomes removed from the natural thickness, the more it is necessary to add pairs of edge devices. This number is frequently for example 7 pairs in a production line of float glass with dimensions which are common for the building industry, but can be as much as 20 pairs or more in production lines for extra-thin glass (less than 0.75 mm).

At present, the edge devices generally have an architecture of two types, i.e. on the floor or suspended. These have substantially the same functions, except that the suspended devices have the advantage of less space taken upon the floor, with greater stability since they are independent from the imperfections and unevenness of the floor.

The edge devices are equipped with auxiliary mechanisms which make it possible to position on various axes the wheel which drives the edge of the ribbon of float glass. These mechanisms are installed on a fixed frame along the float chamber. The assembly constituted by the frame, the positioning mechanisms and the edge device itself will be known as the machine.

The horizontal direction of the axis of the process is generally known as X, and is identical to the main axis of the bath of tin; Y is the axis perpendicular to X on the same horizontal plane, and Z is the vertical direction. For each edge device, the "plane of angulation" is a vertical plane containing the axis of rotation of the wheel, which in the conventional embodiment is combined with the longitudinal axis of the lance.

The edge devices generally permit five movements of the lance on the end of which the wheel is secured:

1. A rotation of the lance-wheel assembly in the barrel, around the longitudinal axis of the lance, at variable speed;
2. A movement of angulation, also known as slew, which is generated by the pivoting of the assembly of the chassis supporting the edge device around a vertical axis known as the axis of angulation, coinciding with the axis of the lance and situated in the immediate vicinity of the edge of the bath of tin. The angle known as the angle of angulation, which is the angle between the plane of angulation and Y, can be more or less 20° in extreme cases. This movement is designed to generate the "effective direction" on the edge of the ribbon of glass, and, in the conventional embodiment, the value of the "effective angle" is equal to the value of the angle of angulation;
3. A movement of penetration (advance-withdrawal) of the barrel-lance-wheel assembly in the enclosure of the bath of tin, generated by the displacement of the edge device by guiding on rails according to the axis of intersection of the plane of angulation and the horizontal plane;
4. A movement of rising/lowering generated by the rising/lowering of the barrel-lance-wheel assembly according to Z relative to the frame;
5. A movement of gripping or dipping, generated by pivoting of the barrel relative to the frame of the edge device, according to a horizontal axis perpendicular to the plane of angulation, with the possibility in certain cases of rapid release (emergency disengagement of the wheel from the glass). The angle of dipping is defined as the angle between the horizontal and the longitudinal geometric axis of the barrel, and is positive when the lance which supports the barrel is inclined towards the center of the bath of tin. The angle of gripping on the edge of the ribbon, in the conventional embodiment, is thus directly associated with, and equal to, the angle of dipping. In the conventional embodiment, when the wheel is in contact with the glass, the angle of dipping can be between 0 and 2 to 3°.

Generally, the edge devices are placed in pairs, with two machines opposite on both sides of the bath of tin, and with the axis of angulation of each of the two machines being on the same plane perpendicular to the axis X of the process.

For thick glass, with a thickness greater than the natural balance thickness, i.e. approximately 5.5 mm, the speeds of rotation of the wheels decrease in the direction of travel of the ribbon of glass, and the negative angles of angulation tend to restrict the spreading of the width of the ribbon of glass.

For thin glass, with a thickness smaller than the natural balance thickness, i.e. approximately 5.5 mm, the speeds of rotation of the wheel increase in the direction of travel of the ribbon of glass, and the positive angles of angulation tend to increase the spreading of the width of the ribbon of glass.

The different movements of these devices can be entirely motorized, and absolute encoders make it possible to determine the exact position of the mobile elements of each device.

In general, the wheel is toothed on its periphery, but wheels in the form of a simple disc may be encountered. Their diameter is for example approximately 180 to 260 mm, and they are generally welded or screwed on the lance, which is rotated around its longitudinal geometric axis.

The lance rotates around itself in the barrel, the rotation of which is fixed. At the end of the barrel which is designed to penetrate in the float chamber, thus on the wheel side, the lance is retained by a smooth bearing, for example a carbon ring. At the other end of the barrel, the lance is supported by a ball bearing. The barrel is cooled by a water cooling circuit, and the lance-wheel assembly is also cooled by a different cooling circuit. In order to be able to position the wheel on the edge of the ribbon of glass inside the bath, with a maximum penetration of up to 3 to 4 m, the lance generally has a long length, for example approximately 4 to 5 m, with the barrel generally being slightly shorter, such that the lance projects the wheel at a distance of approximately 50 cm from the end of the barrel.

The lance and the wheel are rotated by means of an electric motor, and generally the wheels of a single pair rotate at the same speed, but depending on the application they can also rotate at slightly different speeds.

All these known edge devices have the major disadvantage of needing a large space on the exterior of the bath of tin. In fact, in order to be able to extract the lance and the wheel completely from the enclosure of the bath of tin, the movement of penetration is used, which must therefore have a course which is sufficiently greater than the maximum length of penetration of the wheel in the bath. This movement of penetration is carried out by linear guiding on a frame on the exterior of the bath, the length of which generally exceeds the penetration course of 1 to 2 m.

In addition, in order to orient the wheel relative to the ribbon of glass, and in particular in order to carry out the "angulation" movements, and therefore generate an "effective direction", the assembly of the machine must pivot on the axis of angulation which is positioned in the immediate vicinity of the edge of the float chamber, which gives rise to substantial displacement according to the axis X of the end of the frame of the machine opposite the wheel. This substantial displacement is associated with the length of the lance, and can be as much as 1.5 m according to X on both sides, relative to the position of zero angulation. Consequently, when two pairs of machines are placed at short distance from one another in the direction according to the process, the "angulation" which the second pair may adopt relative to the first is limited by the interference of the rear parts of the two machines. This situation arises quite frequently during production of thin or ultra-thin glass with quite low ribbon speeds.

During changes of angulation, the position at X of the wheel in the bath of tin also varies all the more, the greater the penetration, which modifies the distribution at X of the points of action on the edges of the ribbon, and therefore makes the different combinations of parameters not automatically similar according to X. This disrupts the visual analysis by the process controllers, and complicates the use of video monitoring of the process, since the wheels can leave the field of the cameras during a change of angulation. The different combinations of parameters are therefore also not automatically similar according to the profile of the temperature curve of the ribbon of glass, which also makes the analyses of the process more complex.

Figure 1:
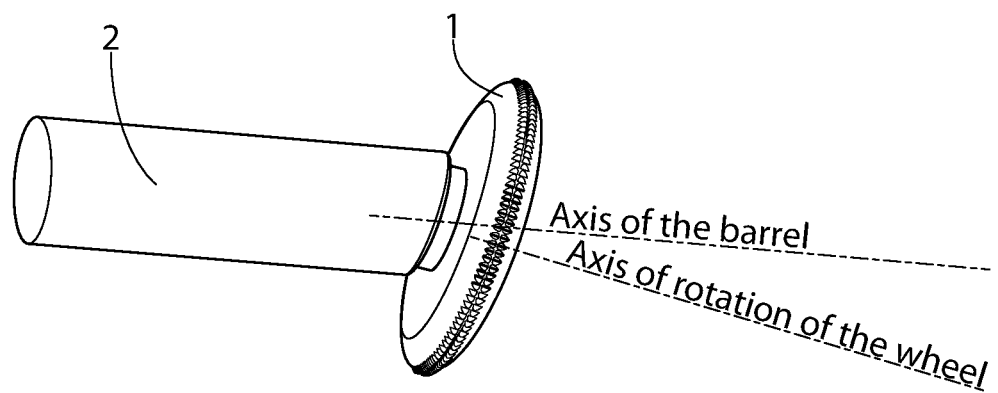
FIG. 1 is a perspective view of a device for handling an edge in accordance with an embodiment of the invention.

POSSIBLE SOLUTION FOR THE IMPERFECTIONS OF THE PRIOR ART AND TECHNICAL PROBLEM TO BE SOLVED

In order to solve these problems, it is possible to choose to create the movement of angulation, and consequently the effective direction, not by displacing the assembly of the machine, but simply by positioning the axis of angulation of the wheel at the end of the barrel, with the lance becoming so short that its axis is combined with that of the wheel, as disclosed in WO 2011098423.

In this solution, the axis of rotation of the wheel coincides with that of the barrel, and the five movements of the wheel relative to the bath of tin can for example be carried out as follows, in the knowledge that, for each machine, by virtue of similarity with the conventional embodiment, a vertical plane containing the axis of rotation of the wheel will be known as the plane of angulation.

1. The rotation of the wheel is carried out at the end of the barrel, whereas the barrel remains fixed and its longitudinal axis continues to be contained permanently either on a vertical plane perpendicular to X, or on a vertical plane which forms an angle with the vertical plane perpendicular to X. This angle will be known as the "basic angle", and will be positive when its effect on the effective angle is also positive. The rotation of the wheel is generated by an integrated system, or by a flexible drive which permits angular offsetting between the axis of rotation of the wheel and the longitudinal geometric axis of the barrel. In comparison with a conventional device, the fact that the barrel remains permanently in the same position makes it possible to avoid any interference between successive machines which are associated with the creation of the angulation.

2. The angulation movement is generated by pivoting the support of the wheel at the end of the barrel, according to an axis which coincides with, and is perpendicular to, the axis of the barrel, and is contained on a vertical plane. The angle which is known as the angle of angulation, i.e. the angle between the plane of rotation of the wheel and a plane perpendicular to the axis of the barrel, and which is identical to the angle formed by the longitudinal axis of the barrel and the axis of rotation of the wheel, will be adjustable from +20 to −20° in the extreme cases. The effective angle of the process is thus the sum of the basic angle and of the angle of angulation.

3. The movement of penetration (advance-withdrawal) of the barrel-wheel assembly in the enclosure of the bath of tin is generated as conventionally, by displacement of the edge device by guiding on rails according to an axis parallel to Y.

4. The movement of rising/lowering is generated as conventionally, by the rising/lowering according to Z of the barrel-wheel assembly relative to the frame.

5. The movement of gripping or dipping is generated as conventionally, by pivoting of the barrel relative to the frame of the edge device, according to a horizontal axis parallel to X, with the possibility in certain cases of rapid release (emergency disengagement of the wheel from the glass).

The movements as well as the structure of the machine which carries them out are therefore unchanged as far as points 3, 4 and 5 above are concerned.

This solution makes it necessary to incorporate in a reduced volume at the end of the barrel highly complex mechanisms which make it possible firstly to generate or transmit the movement of rotation of the wheel homokinetically, and secondly to control a variable angle of the axis of rotation of the wheel relative to the axis of the barrel, in a hostile environment which requires a complex cooling circuit.

DETAILED DESCRIPTION OF THE INVENTION

The invention makes it possible to achieve the same objective of creation of adjustable effective direction whilst maintaining the barrel permanently in the same position, as disclosed in WO 2011098423. However, this objective is achieved by means of a simplified embodiment which has almost the same advantages, set against reduced complexity. For this purpose, according to the invention, a device is provided for handling the edge of a ribbon of glass in viscous form being displaced on a liquid bath in a float chamber, comprising a wheel which is arranged at a distal end of a barrel, characterized firstly in that the wheel rotates around its own axis, and secondly in that this axis of rotation of the wheel forms together with the longitudinal geometric axis of the barrel a permanent fixed angle, other than zero, which can not be modified by regulation, and the value of which is determined by design, ideally of the maximum "effective angle" value made necessary by the process, such as 15° for example. The permanent fixed angle between the longitudinal axis of the barrel and the axis of rotation of the wheel will be known as the "angle of inclination".

According to the invention, the five movements of the wheel, relative to the bath of tin, can for example be carried out as follows:

1. The rotation of the wheel is carried out at the end of the barrel, whereas the barrel remains fixed and its longitudinal axis continues to be contained permanently either on a vertical plane perpendicular to X, or on a vertical plane which forms an angle with the vertical plane perpendicular to X. This angle will be known as the "basic angle", and will be positive when its effect on the effective angle is also positive. The rotation of the wheel is generated by an integrated system, or by a flexible drive which permits angular offsetting between the axis of rotation of the wheel and the longitudinal geometric axis of the barrel.
2. The "effective direction", characterized by the "effective angle" is generated by the rotation of the barrel according to its own longitudinal axis, thus modifying the orientation of the plane of rotation of the wheel at the end of the barrel. As a reminder, the effective direction is determined as the intersection of the plane of the upper surface of the ribbon of glass and of the plane of rotation of the wheel. The effective angle can thus achieve as a maximum more or less the value of the permanent fixed "angle of inclination", plus the value of the basic angle.
3. The movement of penetration (advance-withdrawal) of the barrel-wheel assembly in the enclosure of the bath of tin is generated as conventionally, by displacement of the edge device by guiding on rails according to an axis parallel to Y. In some embodiments, a device for automatic mechanical or electrical correction of a penetration of the barrel according to a value of regulation of a rotation of the barrel is installed in order to keep constant in penetration a position of a point of contact between the wheel and the edge of the ribbon of glass.
4. The movement of rising/lowering is generated as conventionally, by the rising/lowering according to Z of the barrel-wheel assembly relative to the frame. In some embodiments, a device for automatic mechanical or electrical correction of a height of the barrel according to a value or regulation of a rotation of the barrel may be installed in order to keep a level of contact constant between the wheel and the edge of the ribbon of glass.
5. The movement of gripping or dipping is generated as conventionally, by pivoting of the barrel relative to the frame of the edge device, according to a horizontal axis parallel to X, with the possibility in certain cases of rapid release (emergency disengagement of the wheel from the glass).

It should be noted that, in comparison with the conventional solution, or the one presented in WO 2011098423, the effective direction of the edge device is created by the orientation of the plane of rotation of the wheel relative to the longitudinal axis of the barrel, and that, consequently, the angle of gripping also varies in a distinctly greater range of values. This range of the angle of gripping will extend to more or less the value of the "angle of inclination", plus the value of the angle of dipping.

The invention also relates to an installation for production of flat float glass, comprising a float chamber in which a liquid is displaced, on which molten glass in viscous form is made to float and spread forming a ribbon, characterized in that it comprises at least one device for handling the edge of the ribbon of glass as previously defined.

Detailed Description of a Possible Embodiment According to the Invention

In addition to the arrangements in principle previously described, the invention consists of a certain number of other arrangements presented in embodiments which are described hereinafter with reference to the appended drawings, but are in no way limiting. In these drawings:

FIG. 1 shows the principle of an embodiment of a device for handling an edge according to the invention, which shows that the wheel 1 is installed at the end of a barrel 2, such that the axis of rotation of the wheel is inclined by a fixed angle of inclination other than 0° relative to the axis of the barrel 2. The wheel can rotate around its own axis, and is fitted such that this axis of rotation around itself coincides with the longitudinal geometric axis of the barrel, and forms together with the latter a permanent fixed non-zero angle which cannot be modified by regulation, and the value of which is determined by design. The value of this angle is between 5 and 30°, and preferably between 15 and 20° in most cases. The wheel 1 may be rotated by a transmission seal, which may be homokinetic in some embodiments. The rotation of the wheel 1 may be generated by one of an electrical, hydrostatic, or hydraulic systems positioned within the wheel 1 or a hub of the wheel 1. The barrel may comprise one or more circuits which convey and collect a fluid for cooling of the wheel and the barrel. Furthermore, the barrel may comprise one or more circuits which convey and collect a fluid necessary for cooling a the barrel and the means for rotating the wheel, with the exception of the wheel, the latter being constituted by a material which is resistant to high temperatures, and not being cooled by one of these circuits.

Figure 2:
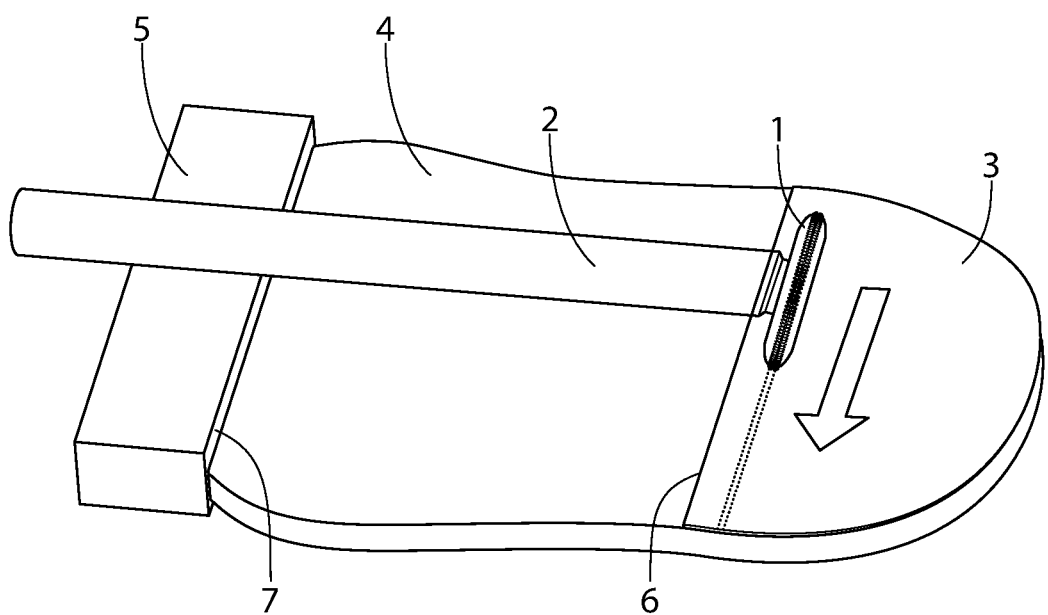
FIG. 2 is a perspective view illustrating the device of FIG. 1 spreading a ribbon of glass on a surface of a tin in accordance with a fist embodiment of the invention.

FIG. 2 represents a possible use of an embodiment of the invention, in a situation of spreading of a ribbon of glass in viscous form 3 on the surface of the tin 4, with an arrow indicating the direction of travel of the ribbon of glass according to the process. The axis of the barrel 2 is on a vertical plane perpendicular to the axis according to the process, thus creating a basic angle of 0°. The teeth of the wheel 1 penetrate via the upper surface into the ribbon of glass 3 in the vicinity of the edge 6 of the latter, in order to control its spreading, in this case according to an effective direction of 020. For this purpose, the barrel 2 is positioned such as to rotate so that the plane which is formed by the axis of the barrel and the axis of rotation of the wheel is vertical, and the face of the wheel is turned towards the upper surface of the ribbon of glass. The angle of gripping is in this case maximum and equal to the angle of inclination. The edge of the ribbon of glass is shown straight for ease of representation, and forming an angle of 0° relative to the edge 7 of the border 5 of the bath of tin, although in reality the edge of the ribbon has curvature which is variable at any point depending on the balance of the forces in play in the sheet of glass. An electromechanical device for control of the orientation of the barrel 2 may be installed in order to create and maintain an effective orientation of the wheel 1 on the edge 6 of the ribbon of glass 3.

Figure 3:
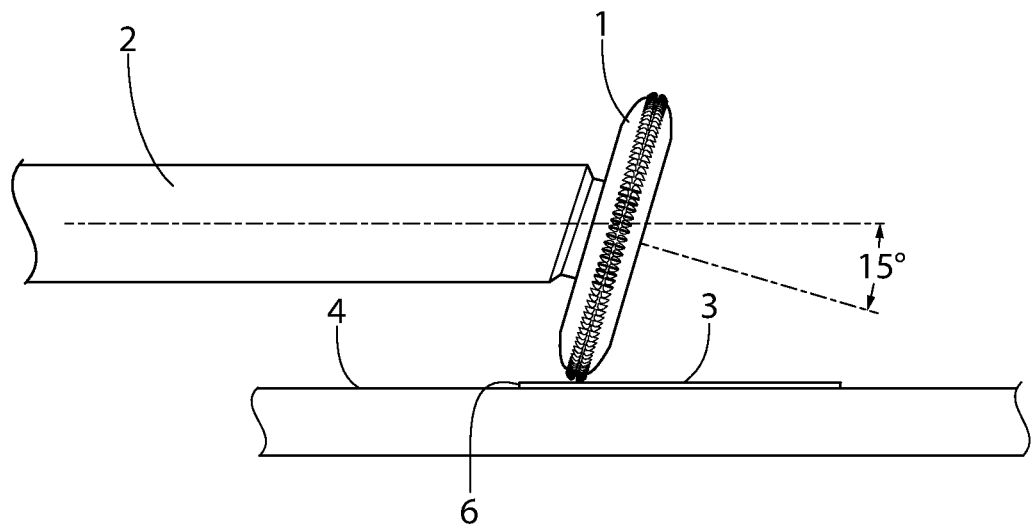
FIG. 3 is a side view of the device of FIG. 1 spreading a ribbon of glass on a surface of a tin in accordance with the first embodiment of the invention.

FIG. 3 represents a view in cross-section perpendicular to the axis X of the bath, in the situation in FIG. 2. It can be seen that the angle between the plane of rotation of the wheel and a horizontal plane is equal to the value of the angle of inclination of the wheel plus the angle of dipping (angle between the axis of the barrel and a horizontal plane). In this case, by way of example, the angle of inclination is 15° and the angle of dipping is 0°. The regulation of the rotation of the barrel is neutral for the effective direction, since it produces an effective angle of 0°, and by convention this regulation of rotation of the barrel will be allocated the value 0° when the face of the wheel is turned towards the upper surface of the ribbon of glass. The regulation of the rotation of the barrel is observed in an anticlockwise manner from the barrel towards its end which supports the wheel. The effective angle can adopt a positive maximum value equal to the angle of inclination of the wheel, for regulation of the barrel equal to 90°, and a negative minimum value for regulation of the barrel equal to −90°.

Figure 4:
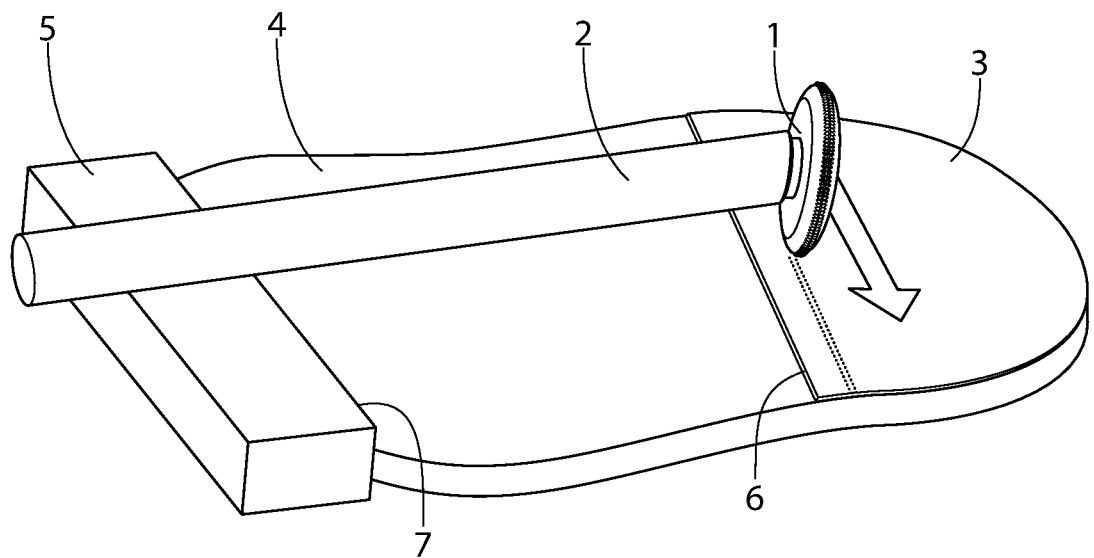
FIG. 4 is a perspective view illustrating the device of FIG. 1 spreading a ribbon of glass on a surface of a tin in accordance with a second embodiment of the invention.

FIG. 4 represents a possible use of an embodiment of the invention in a situation similar to that of FIG. 2, except that the effective angle of the process presented in this case is +10°, which corresponds to imposing widening of the ribbon of glass. The edge of the ribbon of glass is presented straight for ease of representation, and forming an angle of 10° relative to the edge 7 of the bath of tin, although in reality the edge of the ribbon has curvature which is variable at any point depending on the balance of the forces in play in the sheet of glass. The teeth of the wheel 1 penetrate via the upper surface into the ribbon of glass 3 in the vicinity of the edge 6 of the latter, in order to control its spreading, in this case according to an effective angle of 10°. For this purpose, the barrel 2 is positioned such as to rotate so that the plane formed by the axis of the barrel and the axis of rotation of the wheel is inclined by approximately 41° relative to a vertical plane, and the face of the wheel is turned towards the upper surface of the ribbon of glass. In this situation, the value of the angle of gripping is 11.23°.

Figure 5:
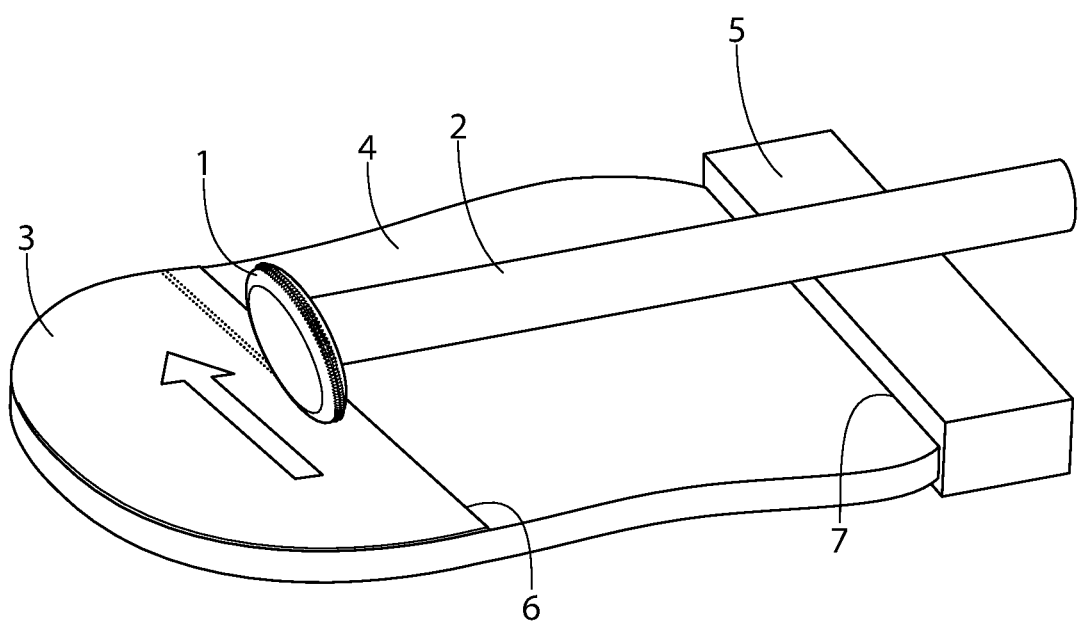
FIG. 5 is a perspective view illustrating the device of FIG. 1 spreading a ribbon of glass on a surface of a tin in accordance with a third embodiment of the invention.

FIG. 5 represents a possible use of an embodiment of the invention in a situation similar to that of FIG. 2, except that the effective angle of the process presented in this case is −5°, which corresponds to imposing narrowing of the ribbon of glass. The edge of the ribbon of glass is presented straight for ease of representation, and forming an angle of −5° relative to the edge 7 of the bath of tin, although in reality the edge of the ribbon has curvature which is variable at any point depending on the balance of the forces in play in the sheet of glass. The teeth of the wheel 1 penetrate via the upper surface into the ribbon of glass 3 in the vicinity of the edge 6 of the latter, in order to control its spreading, in this case according to an effective angle of −5°.

For this purpose, the barrel 2 is positioned such as to rotate so that the plane formed by the axis of the barrel and the axis of rotation of the wheel is inclined by approximately −19° relative to a vertical plane, and the face of the wheel is turned towards the upper surface of the ribbon of glass. In this situation, the value of the angle of gripping is 14.17°.

The invention claimed is:

1. A device for handling the edge of a ribbon of glass in viscous form being displaced on a liquid bath in a float chamber, the device comprising:
   a wheel, installed at the distal end of a barrel, wherein the wheel rotates around a wheel axis, and is fitted to the barrel such that the wheel axis coincides with a longitudinal geometric axis of the barrel, the wheel axis and the longitudinal geometric axis forming a permanent fixed angle other than zero, which can not be modified by regulation, and the value of which is determined by design, said value being between 5 and 30°, the wheel being disc-shaped and defining a plane of rotation that is perpendicular to the wheel axis and oblique to the longitudinal geometric axis;
   wherein the barrel is rotatable around the longitudinal geometric axis to modify an orienation of the plane of rotation of the wheel; and
   a means for rotating the wheel.

2. The device as claimed in claim 1, wherein the barrel has scope for regulation in rotation around the longitudinal geometric axis of 180°.

3. The device as claimed in claim 1, wherein an electro-mechanical device for control of the orientation of the barrel is installed in order to create and maintain an effective orientation of the wheel on the edge of the ribbon of glass.

4. The device as claimed in claim 1, wherein a device for automatic mechanical or electrical correction of a height of the barrel according to a rotational orientation of the barrel is installed in order to keep a level of contact constant between the wheel and the edge of the ribbon of glass.

5. The device as claimed in claim 1, wherein a device for automatic mechanical or electrical correction of a penetration of the barrel according to a rotational orientation of the barrel is installed in order to keep constant in penetration a position of a point of contact between the wheel and the edge of the ribbon of glass.

6. The device as claimed in claim 1, wherein the barrel comprises one or more circuits which convey and collect a fluid for cooling of the wheel and the barrel.

7. The device as claimed in claim 1, wherein the barrel comprises one or more circuits which convey and collect a fluid necessary for cooling of the barrel and the means for rotating the wheel, and wherein the wheel is formed from a material which is resistant to high temperatures and is not cooled by the one or more circuits.

8. An installation for production of flat float glass, comprising a float chamber containing molten metal on which molten glass in viscous form is made to float and spread, forming a ribbon, the installation comprising at least one device for handling of the edge of the ribbon of glass as claimed in claim 1.

9. The device as claimed in claim 1, wherein an outer face of the wheel that is located furthest from the barrel always faces away from the edge of the ribbon of glass.

10. The device as claimed in claim 1 wherein during rotation of the barrel about the longitudinal geometric axis, the orientation of the plane of rotation of the wheel alters between: (1) facing downwardly towards the ribbon of glass; and (2) facing upwardly away from the ribbon of glass.

11. The device as claimed in claim 1, wherein the wheel axis intersects the barrel in all rotational positions of the barrel and in all rotational positions of the wheel.

12. The device as claimed in claim 1 wherein the barrel is rotatable around the longitudinal geometric axis independent of the rotation of the wheel around the wheel axis.

13. The device as claimed in claim 1 wherein the longitudinal geometric axis of the barrel is at a fixed location such that the longitudinal geometric axis of the barrel is configured to be at a fixed orientation relative to a direction of flow of the ribbon of glass on the liquid bath.

14. The device as claimed in claim 1 wherein the wheel rotates around the wheel axis independently of the rotation of the barrel around the longitudinal geometric axis.

15. A device for handling the edge of a ribbon of glass in viscous form being displaced on a liquid bath in a float chamber, the device comprising:
   a barrel having a distal end and a longitudinal geometric axis;
   a wheel coupled to the distal end of the barrel, wherein the wheel rotates around a wheel axis and is coupled to the barrel such that the wheel axis intersects the longitudinal geometric axis of the barrel at a permanent fixed angle between 5° and 30°; and wherein the wheel defines a plane of rotation that is perpendicular to the wheel axis, and wherein the plane of rotation does not intersect the barrel.

16. The device as claimed in claim 15 wherein the plane of rotation of the wheel always faces away from the edge of the ribbon of glass.

17. The device as claimed in claim 15 wherein the plane of rotation of the wheel is configured to face downwardly towards the ribbon of glass or upwardly away from the ribbon of glass depending on a rotational orientation of the barrel along the longitudinal geometric axis.

* * * * *